United States Patent [19]

Castellani

[11] Patent Number: 5,251,505
[45] Date of Patent: Oct. 12, 1993

[54] SPEED REDUCER WITH GEARS HAVING PARALLEL AXES

[76] Inventor: Giovanni Castellani, Via E. Orlandi 9, 41100 Modena, Italy

[21] Appl. No.: 805,769

[22] Filed: Dec. 12, 1991

[30] Foreign Application Priority Data

Dec. 17, 1990 [IT] Italy .................. 3777 A/90

[51] Int. Cl.⁵ .............. F16H 35/02; F16H 35/08; F16H 55/18
[52] U.S. Cl. ..................... 74/392; 74/401; 74/403; 74/409; 74/423
[58] Field of Search ............. 74/392, 401, 403, 409, 74/410, 421 R, 420, 423

[56] References Cited

U.S. PATENT DOCUMENTS

| | | | |
|---|---|---|---|
| 1,143,044 | 6/1915 | Fuchs | 74/401 X |
| 2,017,527 | 10/1935 | Carlson | 74/421 R |
| 2,982,144 | 5/1961 | Wallgren | 74/392 X |
| 4,106,366 | 8/1978 | Altenbokum et al. | 74/410 X |
| 4,196,046 | 4/1980 | McConnel | 74/392 X |
| 4,524,643 | 6/1985 | Ziegler et al. | 74/409 X |
| 4,827,789 | 5/1989 | Hallidy et al. | 74/409 X |
| 5,048,360 | 9/1991 | Kuhn et al. | 74/409 X |

Primary Examiner—Leslie A. Braun
Assistant Examiner—David E. Henn
Attorney, Agent, or Firm—Guido Modiano; Albert Josif

[57] ABSTRACT

The speed reducer comprises a first shaft which is supported so as to be able to slide axially, is suitable for being rotatingly actuated and a pinion whose set of teeth are slightly beveled is located thereon. A second shaft is supported so as to be able to slide axially with an axis parallel to the first shaft and a gear and a further pinion, are located thereon both having sets of teeth slightly beveled in opposite directions and suitable for meshing respectively with the pinion of the first shaft and with a further gear which is fixedly located on an output shaft, coaxial to the first shaft. A device is provided for adjusting the axial position of the first shaft, so as to move the sides of the conical sets of teeth of the gears closer in order to eliminate the related clearances.

7 Claims, 1 Drawing Sheet

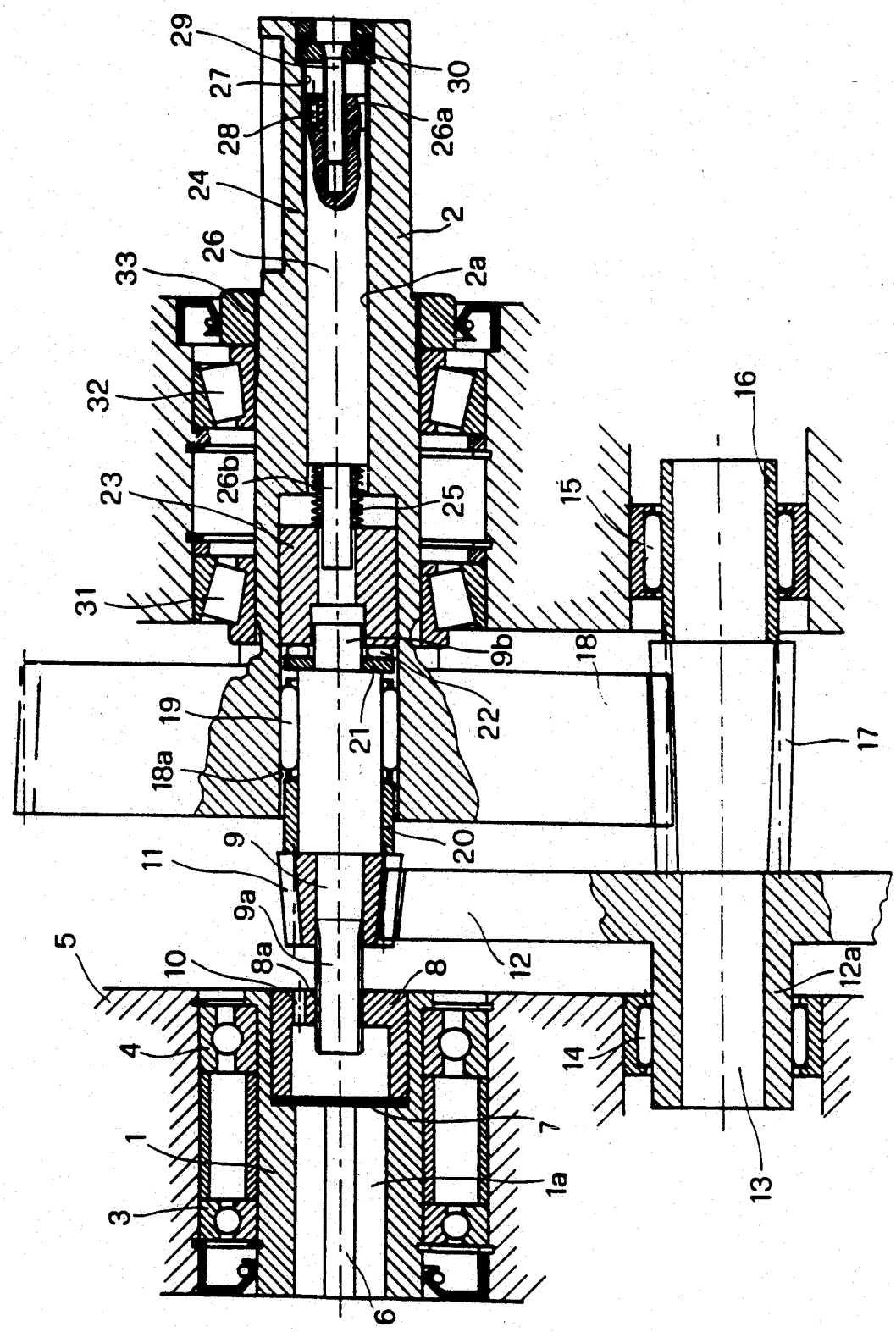

SPEED REDUCER WITH GEARS HAVING PARALLEL AXES

BACKGROUND OF THE INVENTION

The present invention relates to a speed reducer with gears having parallel axes.

The possibility of eliminating clearance between the sides of the teeth of two meshing gears with parallel axes by providing the related sets of teeth with a slight taper is known. Said gears are mounted so that their tapers are directed toward opposite sides and are moved axially toward one another until the teeth make contact on both the homologous side and the antihomologous side.

However, the problem of eliminating clearances between the sides of the teeth in gears of multiple-stage speed reducers has not been solved. This problem currently occurs in several applications, in particular for robotics.

Internal clearances not only increase the noise of the reducer, but also produce a transmission error, i.e. an angular offset of the output shaft. In this respect, reducers which limit transmission error to a maximum of 3 minutes of a degree are generally considered to be of the low-clearance type.

SUMMARY OF THE INVENTION

The aim of the present invention is to solve the described problem by providing a speed reducer with gears having parallel axes which allows to take up the clearance between the sides of the teeth of both gear pairs, so as in practice eliminate the reducer transmission error.

Within the scope of this aim, an object of the present invention is to provide a gear speed reducer which is simple in concept, safe and reliable in operation and versatile in use.

This aim and object as well as other objects which will become apparent hereinafter, are achieved, according to the invention, by the present speed reducer with gears having parallel axes, which is characterized in that it comprises a first shaft, axially slidably supported and adapted for being rotated by a motor shaft which is coaxial thereto and is provided with a pinion having teeth slightly beveled, a second shaft, axially slidably supported with an axis parallel to said first shaft and provided with a gear and with a further pinion. The sets of teeth thereof are slightly beveled in opposite directions and adapted for meshing respectively with said pinion of the first shaft and with a further gear which is rigidly associated with an output shaft coaxial to said first shaft; and a device for adjusting the axial position of said first shaft, whereby to move said conical sets of teeth of said gears in close mesh in order to eliminate the related clearances.

BRIEF DESCRIPTION OF THE DRAWINGS

The details of the invention will become apparent from the detailed description of a preferred embodiment of the speed reducer with gears having parallel axes, illustrated only by way of non-limitative example in the accompanying drawing, wherein:

the only FIGURE is a longitudinal sectional view of the gear speed reducer according to the invention.

DESCRIPTION OF THE PREFERRED EMBODIMENTS

With particular reference to said FIGURE, the reference numeral 1 designates the motor shaft which is intended to transmit motion to the output shaft 2 of the reducer. The motor shaft 1 is rotatably supported by the body 5 of the reducer, by means of a pair of rolling bearings 3 and 4.

In the case shown by way of example, the motor shaft 1 has a tubular shape and is internally provided with a longitudinal recess 6 for a conventional key for the direct insertion and keying of the shaft of a conventional electric motor, not illustrated in the drawing; the electric motor is fixed to the body 5 of the reducer by means of appropriate flange means.

The axial cavity 1a of the shaft 1 is closed by a plug 7 for preventing the escape of lubricant from the reducer. The plug 7 is locked by a sleeve 8 which is press-fitted in a seat appropriately defined in the cavity 1a, so as to transmit torque without slipping.

The sleeve 8, which is cup-shaped, is axially provided with a spline hole 8a, which is preferably formed by broaching; the correspondingly splined end portion 9a of a shaft 9 engages the hole 8a so as to be freely axially slidable and to provide torque coupling to the shaft 1. A hole 10 of the sleeve 8 is suitable for maintaining a constant air pressure inside said sleeve.

A pinion 11 is keyed without clearance to the shaft 9 and meshes with a gear 12 which is keyed without clearance to a second shaft 13, which is parallel to said first shaft 9. The second shaft 13 is rotatably supported by the body of the reducer by means of a pair of roller bearings 14 and 15 which are adapted for allowing axial movements; the rollers of the bearing 14 roll on a protrusion 12a of the gear 12, whereas the rollers of the bearing 15 roll on a ring 16 mounted at the end of the shaft 13.

The shaft 13 is centrally provided with a further pinion 17 which meshes with a further gear 18 integrally formed on the output shaft 2 of the reducer. It is naturally possible to key the pinion 17 and the gear 18 without clearance on the shafts 13 and 2.

Said pinions 11 and 17 and said gears 12 and 18 have complementary sets of teeth slightly beveled in opposite directions for each gear and in opposite directions for each set composed of a pinion and a gear which rotate about the same axis.

Conveniently, the tapers of the gears are provided so as to compensate the respective axial thrusts.

In the illustrated case, small-size pinions have been used in order to obtain a high overall transmission ratio of the reducer; it is obviously easy to obtain smaller transmission ratios by increasing the diameter of the pinion 11 and by reducing the diameter of the gear 12, and possibly by increasing the diameter of the pinion 17 and by decreasing the diameter of the gear 18.

The shaft 9 is radially supported, on the side opposite to the sleeve 8, by a roller cage 19 inserted in an axial hole 18a of the gear 18; the hole 18a constitutes the continuation of an axial cavity 2a of the output shaft 2. The roller cage 19 is kept in axial position by means of a spacer 20. The assembly formed by the shaft 9 and by the pinion 11 is thus free to move axially.

At the end opposite to the splined portion 9a, the shaft 9 is provided with a tang 9b on which a pivoting ring 21 and a roller cage 22 are mounted and act as axial thrust bearing. A sleeve 23 is suitable for acting on the roller cage 22 and is part of an adjustment device, generally designated by the reference numeral 24, which is accommodated inside the cavity 2a of the output shaft 2 of the reducer. The sleeve 23 can slide freely and is actuated axially by elastic means preferably constituted by cup-shaped springs 25 or the like.

The adjustment device 24 comprises a piston 26 which is slidably mounted for axial sliding movement along the cavity 2a and is provided, on the side directed outward, with a threaded end 26a which screws into a female thread 27 defined in said cavity 2a. On the side directed toward the inside of the reducer, the piston 26 defines an extension 26b which has a smaller diameter and is suitable for guiding the springs 25 which act by compression against the front surface of said piston. The extension 26b of the piston 26 enters the sleeve 23.

The piston 26 is adapted to be moved, by screwing onto the female thread 27, by means of an appropriate tool which engages a plurality of holes 28 defined frontally with respect to said piston. The piston 26 is subsequently locked by means of a screw element 29 which passes through an end element 30, adapted for sealingly closing the axial cavity of the shaft 2 so as to prevent the leakage of lubricant.

The output shaft 2 is supported by a pair of bearings 31 and 32 with conical rollers; a ring 33 which screws onto the shaft 2 is suitable for eliminating the clearance between said bearings. The output shaft is furthermore externally provided with a recess for a tab, intended for coupling with the driven elements, or with other keying means.

The operation of the speed reducer can be easily understood from the above description. The adjustment device 24 allows to axially move the pinion 11 by acting on the shaft 9 by means of the sleeve 23. It is therefore possible to adjust the axial distance between the pinion 11, fixed on the first shaft, and the gear 18 mounted on the output shaft. The shaft 9 is in fact supported so as to be able to slide axially. In this way, it is possible to move the pinion 11 toward the gear 12 until the respective conical sets of teeth on the two sides make contact so as to be in close mesh.

By acting on the gear 12, the adjustment device 24 furthermore causes the axial movement of the second shaft 13, which is also supported so as to be slidable in an axial direction, whereby to move the pinion 17 toward the gear 18 which is fixed to the output shaft, until the respective conical sets of teeth make contact so as to be in close mesh.

The clearances between the sides of the teeth of both gears of the reducer are thus simultaneously and completely eliminated.

Conveniently, the axial thrust of the adjustment device is performed elastically by means of the springs 25 which are interposed between the piston 26 and the sleeve 23. However, the piston 26 may act directly on the sleeve 23.

Elastic adjustment offers the advantage of automatically taking up small clearances which may form during operation of the reducer due to surface wear of the teeth sides for adaptation. In this case, a pre-loading of the springs which overcomes the axial components of the forces between the teeth even during startup is required. To conclude, the described reducer allows to eliminate the clearances of the gears by means of the preliminary axial adjustment of a single pinion. The reducer transmission error is thus practically eliminated. It should be furthermore noted that by virtue of the elimination of the clearances the reducer is particularly quiet.

In the practical embodiment of the invention, the materials employed, as well as the shape and dimensions, may be any according to the requirements.

I claim:

1. Speed reducer with gears having parallel axis comprising:
   a motor shaft;
   a first shaft being axially slidably supported and adapted for being rotated by said motor shaft and coaxial thereto;
   a pinion fixed to said first shaft;
   a second shaft being axially slidably supported with an axis parallel to said first shaft;
   a further pinion fixedly mounted on said second shaft;
   a gear fixedly mounted on said second shaft;
   an output shaft mounted coaxial to said first shaft;
   a further gear fixedly mounted on said output shaft;
   an adjustment device for adjusting the axial position of said first shaft;
   wherein said pinion and said further gear have teeth slightly beveled in opposite directions for meshing into respectively said gear and said further pinion both having teeth slightly beveled with the bevel in correspondingly opposite directions, said pinion being axially movable with said first shaft by means of said adjustment device for being in close mesh with said gear and further for causing axial movement of said second shaft for moving said further pinion in close mesh with said further gear.

2. Reducer according to claim 1, wherein said adjustment device moves axially said first shaft by means of elastic means.

3. Reducer according to claim 1, wherein said adjustment device comprises:
   a piston being mounted for slidingly moving inside an axial cavity of said output shaft;
   thrust-bearing means being mounted inside said axial cavity between an end of said first shaft which is inserted in said axial cavity of said output shaft and an end of said piston; and
   a sleeve being axially slidable inside said axial cavity of said output shaft and acting on said thrust-bearing means,
   said first shaft being rotatably supported and longitudinally slidable within said axial cavity of said output shaft.

4. Reducer according to claim 3, wherein said piston has at said end, facing said thrust-bearing means, an extension entering said sleeve, said extension being adapted for guiding spring means acting by compression between said piston and said sleeve.

5. Reducer according to claim 3, wherein said piston is provided, on the side opposite to said thrust-bearing means, with a threaded end for threadingly engaging into a corresponding female thread, said female thread being provided at an end of said axial cavity away from said sleeve, said piston being adapted for being moved by screwing in said female thread, by means of an appropriate tool for frontally engaging said piston.

6. Reducer according to claim 1, wherein the bevels of the gears and pinions are defined so as to compensate the respective axial thrusts.

7. Speed reducer with gears having parallel axis comprising:
   a motor shaft;

a first shaft being adapted for being rotated by said motor shaft and coaxial thereto;

a pinion fixed to said first shaft;

a second shaft being axially slidably supported with an axis parallel to said first shaft;

a further pinion fixedly mounted on said second shaft;

a gear fixedly mounted on said second shaft;

an output shaft mounted coaxial to said first shaft;

a further gear fixedly mounted on said output shaft; and an adjustment device for adjusting the axial distance between said pinion fixed to said first shaft and said further gear mounted on said output shaft;

wherein said pinion and said further gear have teeth slightly beveled in opposite directions for meshing into respectively said gear and said further pinion both having teeth slightly beveled with the bevel in correspondingly opposite directions, the axial distance between said pinion and said further gear being adjustable by means of said adjustment device to cause axial movement of said second shaft for moving in close mesh said pinion with said gear and said further pinion with said further gear.

* * * * *